(12) United States Patent
Murray et al.

(10) Patent No.: US 6,382,163 B1
(45) Date of Patent: May 7, 2002

(54) STARTER ALTERNATOR WITH VARIABLE DISPLACEMENT ENGINE AND METHOD OF OPERATING THE SAME

(75) Inventors: Allan Dale Murray, Bloomfield; John Edward Brevick, Livonia, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/653,510

(22) Filed: Sep. 1, 2000

(51) Int. Cl.[7] .............................. F02B 75/06
(52) U.S. Cl. ................................. 123/192.1
(58) Field of Search ......................... 123/192.1

(56) References Cited

U.S. PATENT DOCUMENTS

| | | | | |
|---|---|---|---|---|
| 4,543,927 A | * | 10/1985 | Luhn et al. | 123/192.1 |
| 5,020,491 A | * | 6/1991 | Mashino | 123/192.1 |
| 5,730,094 A | * | 3/1998 | Morris | 123/192.1 |
| 5,947,074 A | * | 9/1999 | Yapici | 123/192.1 |
| 6,138,629 A | * | 10/2000 | Masberg et al. | 123/192.1 |
| 6,148,784 A | * | 11/2000 | Masberg et al. | 123/192.1 |
| 6,158,405 A | * | 12/2000 | Masberg et al. | 123/192.1 |

* cited by examiner

Primary Examiner—Marguerite McMahon
Assistant Examiner—Jason Benton
(74) Attorney, Agent, or Firm—Jerome R. Drouillard

(57) ABSTRACT

A system 40 for starting a variable displacement internal combustion engine 12 of an automotive vehicle 10 has a controller 54 coupled to a starter/alternator 42 that is used for initiating the rotation crankshaft 50 of the engine 12. The controller 54 controls the amount of torque provided by the starter/alternator 42 of the crankshaft. The starter/alternator rotates the crankshaft to a predetermined torque to reduce torque ripple in the crankshaft.

17 Claims, 1 Drawing Sheet

STARTER ALTERNATOR WITH VARIABLE DISPLACEMENT ENGINE AND METHOD OF OPERATING THE SAME

TECHNICAL FIELD

The present invention relates generally to internal combustion engines for automotive vehicles, and more specifically, to an automotive vehicle having a starter/alternator coupled to a variable displacement engine.

BACKGROUND

Automotive vehicles with internal combustion engines are typically provided with both a starter motor and alternator. In recent years, a combined alternator and starter motor has been proposed. Such systems have a rotor mounted directly to the crankshaft of the engine and a stator sandwiched between the engine block and the bell housing of the transmission. During initial startup of the vehicle, the starter/alternator functions as a starter. While functioning as a starter, the starter/alternator provides a sufficient amount of starting torque to rotate the crankshaft of the engine before the cylinders are fired. After the engine is fired, an amount of engine torque is provided to the crankshaft from the combustion process in the cylinders. There is a finite amount of time in which both starting torque and engine torque act on the crankshaft.

Starter/alternator systems are particularly suitable for hybrid electric vehicle applications. After the engine is started, the starter/alternator is used as a generator to charge the electrical system of the vehicle.

Variable displacement engines are known to reduce energy consumption and reduce emissions. Such systems typically close off one or more cylinders at a time to reduce displacement. Reducing the number of cylinders is done when a reduced amount of power is needed. One problem associated with such systems is that the torque variation on the crankshaft may make the engine feel rough when operating, particularly at idle. Known variable displacement engines typically reduce the operating cylinders from eight to six to four. However, in certain situations an odd number of cylinders may be desirable. The torque variation in such systems would therefore be exacerbated.

It would therefore be desirable to smooth the torque in a variable displacement engine system during the various operating modes of the engine.

SUMMARY OF THE INVENTION

It is therefore one object of the invention to smooth torque on the crankshaft of the engine during operation.

In one aspect of the invention, a method of controlling the output of a crankshaft of an internal combustion engine with a plurality of cylinders having a starter/alternator coupled to the crankshaft of the engine comprises the steps of:

closing a cylinder;

monitoring crankshaft torque;

rotating the crankshaft of the engine with the starter/alternator; and varying a torque of the starter/alternator to a predetermined torque in response to crankshaft torque.

In the preferred embodiment the predetermined torque corresponds to a torque ripple.

In a further aspect of the invention, a system has a variable displacement internal combustion engine having a crankshaft and cylinder. The crankshaft has a crankshaft torque associated therewith. The starter/alternator is coupled to the crankshaft. A controller is coupled to the starter/alternator for initiating the rotation of said crankshaft to a predetermined torque corresponding to reduce torque ripple in the crankshaft.

One advantage of the invention is that the present invention is suitable for use with variable displacement engine having high torque fluctuation.

Another advantage of the invention is that the number of cylinders may be varied and efficient operation of the engine may be maintained regardless of load.

Other objects and features of the present invention will become apparent when viewed in light of the detailed description of the preferred embodiment when taken in conjunction with the attached drawings and appended claims.

DESCRIPTION OF THE PREFERRED EMBODIMENT

The present invention is described with respect to a hybrid electric vehicle. However, those skilled in the art will recognize the teachings of the present invention may apply to any variable displacement engine.

Figure 1:
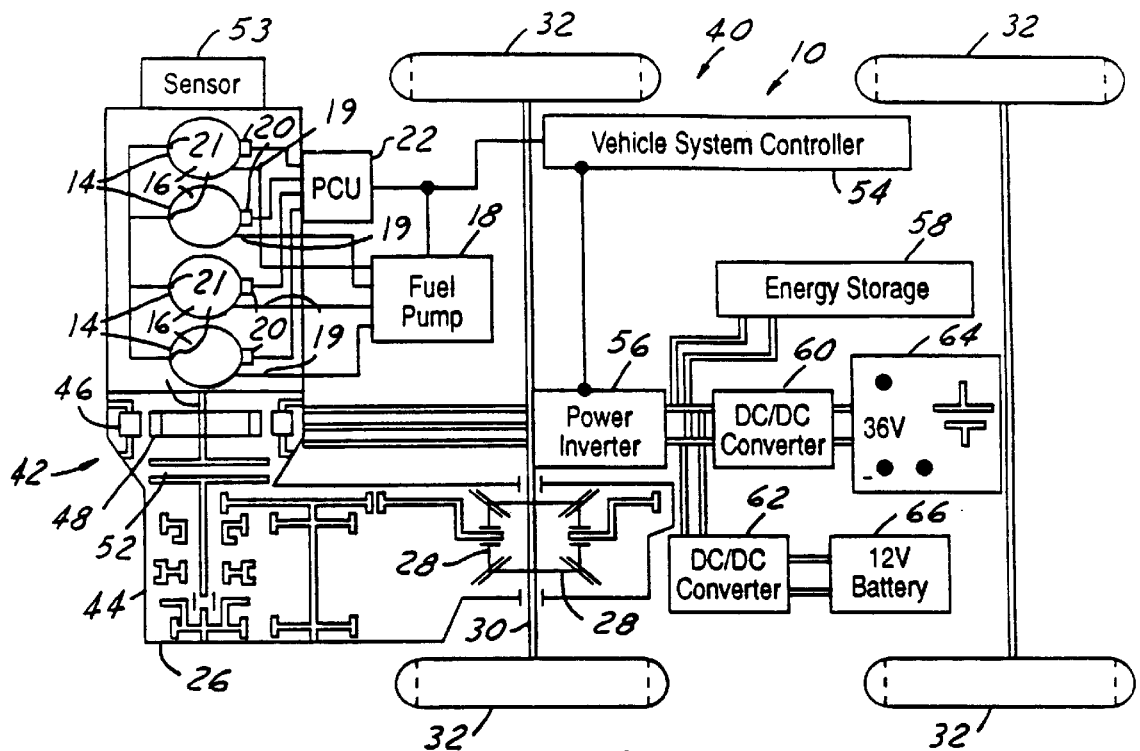
FIG. 1 is a schematic view of an automotive vehicle having a starter/alternator system according to the present invention.

Referring now to FIG. 1, an automotive vehicle 10 is illustrated having a variable displacement internal combustion engine 12 with cylinders 14 with pistons 16 located therein. Each cylinder 14 is coupled to a fuel pump 18 through fuel lines and a fuel injector (no shown) or other fuel delivery system. Air is ultimately introduced into the engine through intake valve 19. Each cylinder 14 also may have a spark plug 20 or other ignition source coupled to a powertrain control unit. Each cylinder 14 also has an exhaust valve 21. Although only one intake valve 19 and exhaust valve 21 are illustrated for simplicity, multiples of each may be used as would be evident to those skilled in the art. A powertrain control unit 22 controls the ignition timing and fuel pump operation 18 in a conventional manner subject to the improvements of the present invention. Also, powertrain control unit controls the closing of valves 19, 21 to seal off desired cylinder to allow the engine to be variable displacement.

Engine 12 is coupled to a transmission 26. Transmission 26 may be automatic or manual. Transmission 26 is coupled to a differential 28 to drive an axle 30 to provide power to wheels 32. Of course, the present invention is also applicable to four wheel drive systems in which all of the wheels 32 are driven. A starter/alternator system 40 that includes a starter/alternator 42 and its associated control electronics is coupled to engine 12. In the present invention, starter/alternator 42 is positioned between a housing 44 of transmission 26 and the engine 12. Starter/alternator 42 has a stator fixedly attached to bell housing 44 and a rotor 48 coupled to a crankshaft 50 of engine 12. A clutch 52 is used to engage and disengage engine 12 from transmission 26. As will be further described below, starter/alternator 42 is used as a starter during engine startup and as an alternator (generator) to supply power to recharge the batteries of the vehicle. Clutch 52 allows starter/alternator 42 to start the engine prior to engagement with the transmission 26.

In one embodiment of the invention, crankshaft 50 has a sensor coupled thereto to determine the relative speed of the crankshaft. The torque of the crankshaft may be derived from the crankshaft speed. Those skilled in the art would recognize various methods for determining crankshaft torque including direct monitoring of a torque sensor.

In an alternative embodiment of the invention, starter/alternator 42 may be monitored to derive crankshaft torque by monitoring the current in the windings. Also, the crankshaft torque may be derived from the operating condition of the vehicle. The torque associated with various operating conditions may be experimentally found and stored in a lookup table within powertrain control unit.

Alternatively, since the variation in torque during one crank revolution will result in an associated variation in angular crank speed, the controller could measure this variation in speed and cause the motor to alternately add and subtract torque in a periodic manner such as to reduce the speed variation.

Starter/alternator system 40 has a system controller 54 that is coupled to powertrain control unit 22 and to a power inverter 56. The power inverter 56 and system controller 54 may, in practice, be contained in a single package. The inverter 56 is used to convert DC power to AC power in the startup mode and AC power to DC power in power generation mode as will be further described below.

In one particular electrical configuration, power inverter 56 is coupled to an energy storage device 58 such as an ultra capacitor, a first DC to DC converter 60, and a second DC to DC converter 62. DC to DC converter 60 is coupled to a 36 volt battery 64. DC to DC converter 62 is coupled to a 12 volt battery 66. This system is referred to as a 42 volt system since 42 volts is available during battery charging. Of course, the actual battery voltage is dependent on the particular system to which it is attached.

Figure 2:
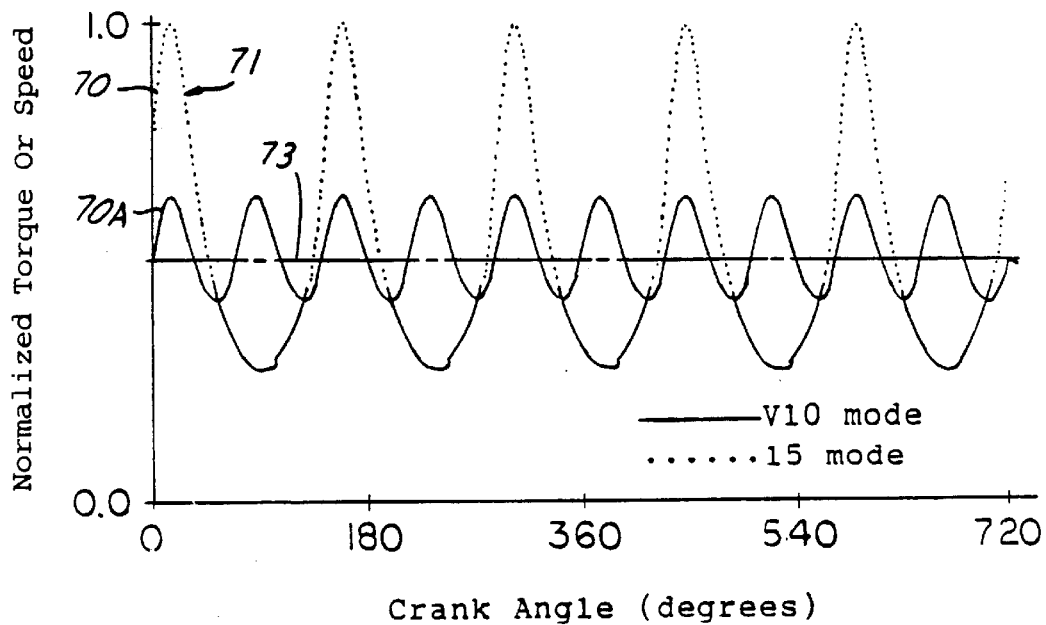
FIG. 2 is a plot of normalized crankshaft torque curve for a variable displacement internal combustion engine of an automotive vehicle in normal and reduced-displacement mode in contrast to crankshaft torque with a starter/alternator according to the present invention.

Referring now to FIG. 2, a normalized torque or speed curve 70 of an engine crankshaft is illustrated without the benefit of the present invention in contrast to a normally operating engine curve 70A. Torque will be described below, however, speed (angular velocity) may be used as wold be evident to those skilled in the art. The engine in this example is a V-10 and operates in a 5 cylinder mode in curve 70. As is illustrated the torque varies, i.e. has a torque ripple 71 which may be perceived as a rough running engine by the vehicle operator. A second torque curve 73 for a crankshaft with the benefit of the present invention is illustrated. Preferably the curve is flat, although smoothing is preferably at least as smooth as the normally operating engine curve 70A. The starter/alternator provides additional torque at intervals where the torque due to cylinder firing drops and removes, or partially offsets torque during cylinder firing. That is, starter/alternator 42 provides periodically alternating torque to smooth torque ripple 71.

In operation, the starter/alternator 42 has a controllable torque. The crankshaft 50 of engine 12 is rotated by starter/alternator 42 to provide additional predetermined torque to smooth the torque ripple on crankshaft 50. Thus, the inverter 56 of starter/alternator system 40 is capable of providing the desired alternating torque to the crankshaft 50 through starter/alternator 42.

When the engine is operated with a reduce number of cylinders, the torque of the engine is monitored directly or found in a look-up table as described above. Thirty-six volt battery 64 provides electrical power for starter/alternator 42 by DC to DC converter 60. Inverter 56 converts the DC power to three-phase AC power. The AC power is supplied to the stator 46 of starter/alternator 42. The starter/alternator 42 rotates rotor 48 which in turn rotates crankshaft 50 of engine 12. Starter/alternator 42 has a predetermined torque that is controlled by system controller 54 to smooth the output of the crankshaft 50.

During operation when the crankshaft reaches the desired torque, the starter/alternator 42 is also used in a generating mode. In the generating mode, the energy storage device 58, and batteries 64, 66 are monitored to determine whether they are fully charged. If the energy storage sources drop below a predetermined charge range, three-phase power from starter/alternator 42 is converted to DC by power inverter 56. It should be noted that the ultra capacitors of energy storage 58 are charged directly by power converter 56.

Advantageously, the present invention reduces torque variation which may manifest itself in various other systems of the vehicle including body structures resulting in a more desirable operation of the variable displacement engine.

While particular embodiments of the invention have been shown and described, numerous variations and alternate embodiments will occur to those skilled in the art. Accordingly, it is intended that the invention be limited only in terms of the appended claims.

What is claimed is:

1. A method of controlling the output of a crankshaft of a variable displacement internal combustion engine with a plurality of cylinders having a starter/alternator coupled to the crankshaft of the engine, said method comprising:

closing a cylinder;

monitoring crankshaft torque;

rotating the crankshaft of the engine with the starter/alternator; and, varying a torque of the starter/alternator to a predetermined torque in response to crankshaft torque.

2. A method as recited in claim 1 wherein the predetermined torque substantially corresponds to a torque ripple in the crankshaft torque.

3. A method as recited in claim 1 wherein monitoring comprises looking up a crankshaft torque in response to engine operating parameters.

4. A method as recited in claim 1 wherein said crankshaft torque is directly monitored.

5. A method as recited in claim 4 wherein the crankshaft torque is monitored with a torque sensor.

6. A method as recited in claim 4 wherein directly monitoring comprises monitoring starter/alternator torque and deriving crankshaft torque.

7. A method as recited in claim 1 wherein monitoring comprises monitoring a crankshaft speed fluctuation by monitoring of the starter/alternator.

8. A method as recited in claim 1 wherein varying comprises providing a substantially constant speed of rotation of the crankshaft.

9. A method of controlling the output of a crankshaft of a variable displacement internal combustion engine with a plurality of cylinders having a starter/alternator coupled to the crankshaft of the engine, said method comprising:

closing a cylinder;

monitoring crankshaft torque having a torque ripple corresponding to a torque imbalance as a function of closing a cylinder;

rotating the crankshaft of the engine with the starter/alternator;

selectively increasing a torque of the starter/alternator to a predetermined torque in response to said torque ripple; and smoothing said torque ripple in response to said predetermined torque and said torque ripple.

10. A method as recited in claim 9 wherein the predetermined torque substantially corresponds to a torque ripple in the crankshaft torque.

11. A method as recited in claim 9 wherein monitoring comprises looking up a crankshaft torque in response to engine operating parameters.

12. A method as recited in claim 9 wherein said crankshaft torque is directly monitored.

13. A method as recited in claim 12 wherein directly monitoring comprises monitoring crankshaft torque with a torque sensor.

14. A system for an automotive vehicle comprising:

a variable displacement internal combustion engine having a crankshaft and a plurality of cylinders, said chankshaft having a crankshaft torque;

a starter/alternator coupled to the crankshaft;

a controller coupled to the starter/alternator for rotating said crankshaft to a predetermined torque to reduce torque ripple in the crankshaft when at least one of said plurality of cylinders is closed.

15. A system as recited in claim 13 further comprising a torque sensor coupled to the crankshaft.

16. A hybrid electric vehicle having the system recited in claim 13.

17. A system as recited in claim 13 wherein said controller monitors a speed of said starter/alternator to determine torque ripple.

\* \* \* \* \*

UNITED STATES PATENT AND TRADEMARK OFFICE
CERTIFICATE OF CORRECTION

PATENT NO.     : 6,382,163 B1
DATED          : May 7, 2002
INVENTOR(S)    : Allan Dale Murray et al.

It is certified that error appears in the above-identified patent and that said Letters Patent is hereby corrected as shown below:

<u>Title page,</u>
Item [75], Inventors, should read as follows:
-- Allan Dale Murray, Bloomfield, MI
  John Edward Brevick, Livonia, MI
  Stephen George Russ, Canton, MI
  Thomas William Megli, Dearborn, MI --

Signed and Sealed this

Thirteenth Day of April, 2004

JON W. DUDAS
*Acting Director of the United States Patent and Trademark Office*